United States Patent [19]

Noma et al.

[11] Patent Number: 5,016,697

[45] Date of Patent: May 21, 1991

[54] SAFETY TIRE HAVING DEFINED CARCASS CURVATURE FROM THE POINT OF MAXIMUM WIDTH TO THE BEAD

[75] Inventors: Hiroyuki Noma; Saneto Saitou; Masaharu Ono, all of Kobe, Japan

[73] Assignee: Sumitomo Rubber Industries, Ltd., Hyogo, Japan

[21] Appl. No.: 262,300

[22] Filed: Oct. 25, 1988

[30] Foreign Application Priority Data

Oct. 27, 1987 [JP] Japan .................................. 62-272557

[51] Int. Cl.$^5$ .......................... B60C 3/04; B60C 17/00
[52] U.S. Cl. ...................................... 152/454; 152/516; 152/544
[58] Field of Search ....... 152/454, 560, 516, 209 WT, 152/544

[56] References Cited

U.S. PATENT DOCUMENTS 4,235,273 11/1980 Edwards et al. .
4,513,802 4/1985 Togashi et al. .
4,669,519 6/1987 Togashi et al. ...................... 152/454
4,708,185 11/1987 Imai et al. .

FOREIGN PATENT DOCUMENTS 0273056 7/1988 European Pat. Off. .
53-138106 12/1978 Japan .................................. 152/544
2120179 11/1983 United Kingdom ................ 152/454

Primary Examiner—John J. Gallagher
Assistant Examiner—Geoffrey L. Knable
Attorney, Agent, or Firm—Birch, Stewart, Kolasch & Birch

[57] ABSTRACT

A safety tire having a carcass turned up in both edges around bead cores, a tread thereon, a belt, a pair of bead apexes, wherein, in a state that the tire is assembled on a specified rim and inflated to a specified pressure, the aspect ratio of the tire is not more than 80%, the axial width WT of the tread is greater than the maximum width WC of the carcass, each edge of the tread is positioned at a height within a range of 50 to 100% of the sectional height HC of the carcass, the carcass provided on each side of the tire equator with a convex arc part with a radius R1 and a concave arc part with a radius R2 smoothly connected each other at an inflection point therebetween, the convex arc part has the center positioned inward of the tire and is extended radially inwardly from the point of the maximum width WC of the carcass to the inflection point, the concave arc part has the center positioned outward of the tire and is extended radially inwardly from the inflection point to the vicinity of a contact point at which the carcass contacts with the bead core, and the radius R2 of the concave arc part is greater than the radius R1 of the convex arc part.

3 Claims, 2 Drawing Sheets

1

SAFETY TIRE HAVING DEFINED CARCASS CURVATURE FROM THE POINT OF MAXIMUM WIDTH TO THE BEAD

BACKGROUND OF THE INVENTION

The present invention relates to a safety tire, and more particularly to a pneumatic tire which enables the driver to drive the vehicle to the repair shop if the tire becomes deflated due to rupture or puncture by a nail or the like.

Conventionally, in order to maintain safety in the event of a tire puncture or burst, there have been proposed a pneumatic tire having an elastic support member therein, a pneumatic tire having a double bulkhead structure provided therein with an annular member having an independent airtight chamber, and a pneumatic tire having an elastic reinforcing layer disposed inside the sidewalls and/or shoulders of the tire.

The tires of the first two types are accompanied by an increase in weight, and, as compared with normally structured tires, are inferior in high speed driving performance and higher in manufacturing cost and are not economical, while the last type is not sufficient in its load supporting effect.

Accordingly, a radial tire having an aspect ratio of 60% or less, in which the tread width is wider than the maximum width of the carcass, and the tread edges are defined in a range smaller than the sectional height of the carcass, is proposed for a safety tire by the present applicant(s) through the specification and accompanying drawings of Japanese Patent Application No. 61-11320.

The safety tire of the previous proposal is intended to allow travel by a widened tread if the internal pressure drops suddenly due to puncture or the like, and therefore it is simple in structure and low in manufacturing cost and hence solves the problems of the prior art to a considerable degree prior to the present invention.

However, even in the tire of the prior art, the bend in the sidewall accompanied with a decrease in the sectional height of the tire caused by a drop in internal pressure, tends to become nonuniform, and the strength of the carcass may be lowered by such a bend.

It is therefore, an object of the present invention to provide a safety tire capable of solving the above-mentioned problems by setting the curvature shape of the carcass of the sidewalls, especially from the point of the maximum width to the bead, in a specified shape, so as to bend easily and uniformly when the internal pressure drops due to a puncture and to prevent damage in such bending zone.

SUMMARY OF THE INVENTION

According to one aspect of the present invention, a safety tire has a tread portion, a pair of bead portions, a pair of sidewall portions therebetween, a pair of bead cores one disposed in each bead portion, a carcass extending between the bead portion through the sidewall portions and the tread portion and turned up in both edges around the bead cores to be secured thereto and to form carcass turnup portions and a carcass main portion therebetween, a tread disposed on the carcass, a belt disposed between the tread and the carcass and having cords laid at a relatively small angle to the tire equator, and a pair of bead apexes one disposed between the carcass main portion and each of the carcass turnup portions, wherein, in a state that the tire is assembled on a specified rim and inflated to a specified pressure, the aspect ratio of the tire defined as the tire sectional height/the tire maximum width is not more than 80%, the axial width WT of the tread is greater than the maximum width WC of the carcass, each edge of the tread is positioned at a height within a range of 50 to 100% of the sectional height HC of the carcass, the carcass provided on each side of the tire equator with a convex arc part with a radius R1 and a concave arc part with a radius R2 smoothly contact with each other at an inflection point therebetween, the convex arc part has a center of curvature positioned inside of the tire and is extended radially inwardly from the point of the maximum width WC of the carcass to the inflection point, the concave arc part has a center of curvature positioned outside of the tire and is extended radially inwardly from the inflection point to the vicinity of a contact point at which the carcass contacts with the bead core, and the radius R2 of the concave arc part is greater than the radius R1 of the convex arc part.

Preferably, the ratio R1/R2 is greater than 0.5 and smaller than 1.0.

BRIEF DESCRIPTION OF THE DRAWINGS

An embodiment of the present invention will now be described below, referring to the drawing, in which.

DETAILED DESCRIPTION OF THE INVENTION

Figure 1:
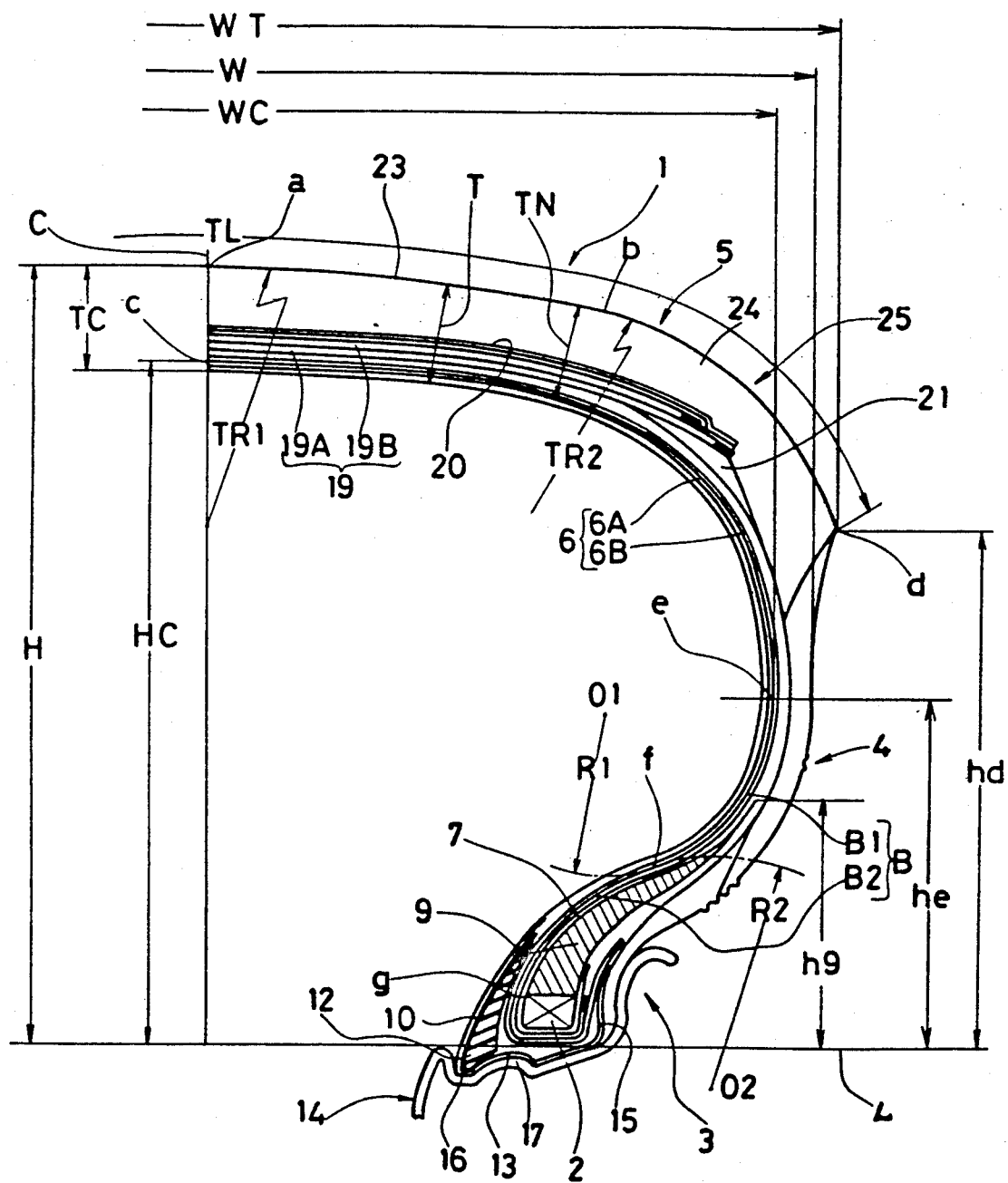
FIG. 1 is a sectional view showing one embodiment of the present invention.

In the drawing, safety tire 1 has bead portions 3 through which a bead core 2 passes, sidewall portions 4 extending from the bead portions 3 outward in the radial direction, and a tread portion 5 extending between the upper ends thereof, thereby defining a toroidal shape. The tire is provided with a carcass 6 having a main portion extending through the sidewall portions 4 and tread portion 5 and contacting with the bead cores 2 at the bead portions 3, and further has turnup portions 2 turned up from the inside to the outside of the tire, and an annular rubber tread disposed on the carcass defining the tread portion.

In this embodiment, the carcass 6 has two radial plies, an inner ply 6A and an outer ply 6B. The cords of the carcass plies 6A, 6B are inclined with respect to the tire equator by 60 to 90 degrees, and for the carcass cords, steel cords or organic fiber cords such as rayon, polyester, nylon and aromatic polyamide fibers may be used.

The tread portion 5 is provided with a belt 19 positioned radially outside the carcass 6.

The belt 19 is composed of a wide inner ply 19A on the carcass side, and a somewhat narrow outer ply 19B contacting with the upper surface thereof, and each of the belt plies 19A and 19B has steel cords inclined at an angle of relatively small degrees with respect to the tire equator.

Furthermore, the tread portion is provided with a band 20 arranged radially outside the belt 19 to cover the entire surface of the belt.

The band 20 is composed of organic fiber cords such as rayon, nylon and polyester, whereby the shear stress acting between the outer surface of the belt 19 and the tread rubber when the tire is deformed is lessened, and separation between the belt edges and the surounding rubber is prevented. Besides, between the carcass 6 and each of the belt edge portions, a breaker cushion 21 made of soft rubber is disposed.

The tire 1 is mounted on a rim 14, and inflated to a specified pressure determined for each tire. The rim 14 is a specific rim determined for each tire.

In this state, the safety tire 1 has an aspect ratio of 80% or less. Incidentally, the aspect ratio is defined as the ratio H/W of the tire sectional height H to the tire maximum width W, wherein the tire sectional height is a radial distance of the highest position (a) on the tire equator C from a bead base line L extending in the tire axial direction through the inner ends of the carcass 6, and the tire maximum width W is the maximum length of the tire in the tire axial direction in the sidewall portions 5.

Furthermore, the outside of the tread 5, that is, the tread surface 25 has a crown portion 23 with a large radius of curvature TR1 positioned in the middle thereof, and shoulder portions 24 with a relatively small radius of curvature TR2 smoothly linked with the crown portion at respective contact points b therebetween.

In this embodiment, the shoulder portions 24 are so extended that the edges d thereof are located in the regions coresponding to the sidewall portions of the conventional tire, whereby the distance between the tread edges d, that is, the tread width WT becomes greater than the maximum width WC of the carcass.

The height hd of the tread edge d from the bead base line L is in a rage of 50 to 100% of the section height HC of the carcass 6, that is, the radial height of the highest position c of the central line of the carcass 6 from the bead base line L. When the carcass has the inner and outer carcass plies 6A, 6B, the central line refers to one therebetween.

Moreover, the thickness T of the tread portion 5, which is the length between a point on the tire inner surface and a point on the tread surface 25 in a direction perpendicular to the inner surface, is in a range of 70 to 200% of the mean thickness of the thickness TC at the tire equator C and the thickness TN at a position apart $\frac{1}{4}$ distance of the carcass maximum width WC from the equator C. If the thickness T is smaller than 70%, safe traveling cannot be maintained if the tire inner pressure drops. On the other hand, if the thickness is over 200%, heat generation in the tread portion 5 tends to be larger in ordinary high speed traveling. Meanwhile, even if the thickness T is less than 200%, it is preferable to enhance the cooling effect by providing a lug pattern in the tread edge portions in order to restrict temperature rise of the tread portion 5 during traveling.

Figure 2:
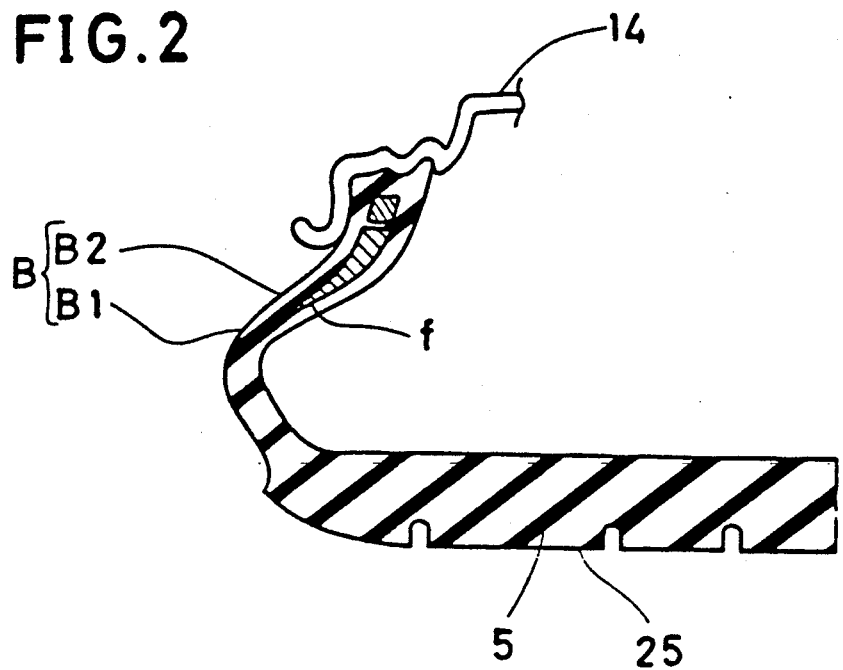
FIG. 2 is a sectional view showing the tire in a state of lowered pressure.

While having such thickness T throughout the tread portion, the tread portion 5 is extended to the above-explained edges d. Accordingly, as shown in FIG. 2, even when the tread surface 25 of the tread portion 5 becomes entirely flattened by a drop in the internal pressure, the tire contacts with the ground only in the tread portion, and thus safe traveling is guaranteed.

Accordingly, to increase the rigidity of the tread portion 5, the width of the belt 19 is set in a range of 60 to 100% of the tread length TL, that is, the entire length between the edges d along the tread surface 25, whereby the tread portion 5 is provided with enough reinforcement to continue traveling for a relatively long time even when the tread surface 25 is depressed due to drop in inflation pressure.

For the cords of the belt 19, organic fiber cords, such as nylon, polyester and rayon, with a modulus of elasticity of not more than 1000 kg/sq.mm may be preferably used. When cords with high modulus of elasticity, such as aromatic polyamide fiber cords and steel cords, are used alone or together with lower modulus cords, the width of this fiber cord ply of the greater modulus of elasticity should be 80% or less of the maximum width WC of the carcass.

Thus, by forming the belt 19 by using organic fiber cords of relatively low modulus of elasticity, it is possible to follow up the deformation of the carcass while keeping the hoop effect of the carcass 6 at the time of deformation.

Figure 3:
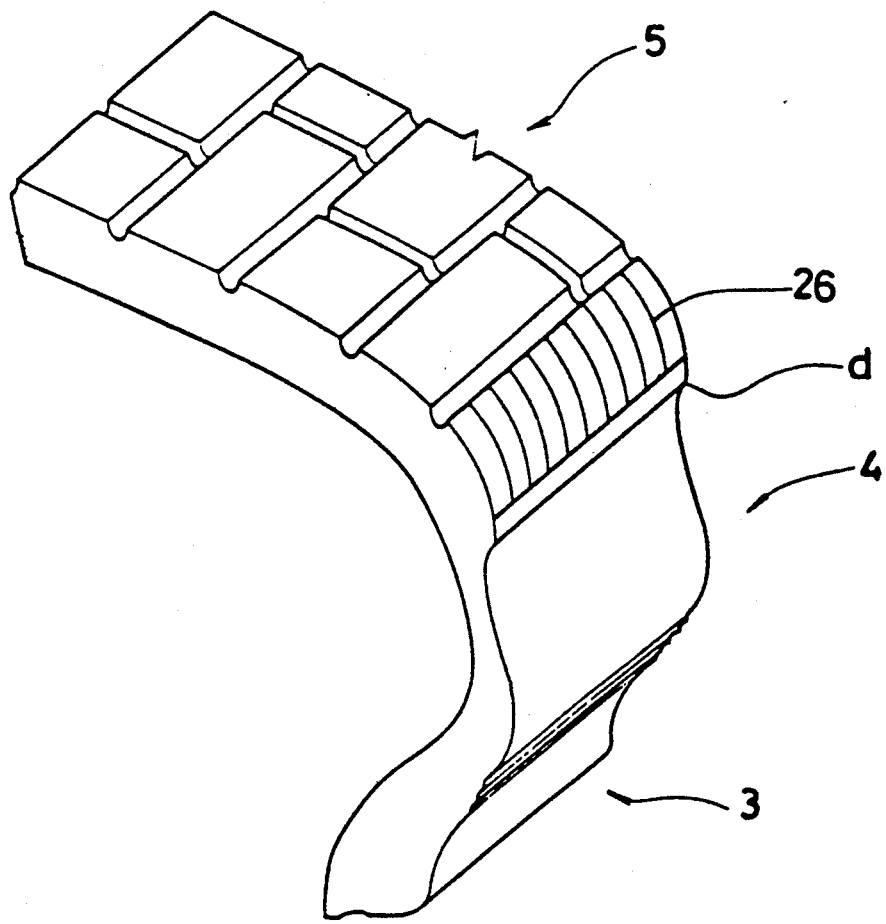
FIG. 3 is perspective view showing the tire with excluding the carcass, belt and other constituents.

Furthermore, as shown in FIG. 3, the tire 1 is provided with sipelike or slitlike fine grooves 26 of 0.1 to 5 mm width in the tread edge region in each tire shoulder at intervals of 5 to 20 mm in the circumferential direction of the tire.

The fine grooves 26 may be formed in any direction, for example, in the tire axial direction, a direction parallel to the tire equator C, or a direction therebetween. If fine grooves are extended in a direction between a direction parallel to the tire equator and a direction with an inclination of 45 degrees thereto, a cooling effect to the tread portion 5 can be expected, and further the longitudinal spring constant of the tread portion may be decreased. Furthermore, if extended in a direction between a normal direction to the tires equator and a direction with an inclination of 45 degrees thereto, the cooling effect is further enhanced.

The fine grooves 26 have a length of 5 to 20% of the length TL of the tread surface 25, and are formed from the respective edges d or slightly inner portions therefrom.

Between the carcass 6 and each bead core 2, a reinforcing layer 7 is disposed to prevent friction therebetween when the carcass 6 moves due to deformation of the tire.

Further, in order to increase the rigidity of each bead portion 3, a bead apex 9 is disposed radially outside the bead core 2 and between the carcass main portion and the turnup portion and further between the axially inner and outer portions of the reinforcing layer 7. The bead apex extends radially outwardly taperingly.

The height h9 of the tip of the bead apex in the radial direction from the bead base line L is in a range of 40 to 90%, more preferably 70 to 80%, of the height hd of the tread edge d. Accordingly, if the tire internal pressure is lowered, the bent zone B from the the carcass maximum width point e to the bead base line L can have a deformation keeping the standard curvature shape, while maintaining the lateral rigidity.

For this purpose, the bead apex 9 is made of rubber having a JIS A hardness of a relatively high range of 74 to 95 degrees.

On each side of the tire equatorial plan C, the part of the carcass 6 in the bent zone B is composed of a convex arc part B1 extending up to the carcass maximum width point e, and a concave arc part B2 extending to the bead core 2, and the convex arc part B1 and the concave arc part B2 are smoothly contact each other at an inflection point f.

The convex arc part B1 is formed in an arc with a radius of R1 which has the center point O1 positioned inside the tire and is extended from the point e to the inflection point f.

The concave arc part B2 is also formed in an arc with a radius of R2 which has the center point O2 positioned outside the tire, thereby showing a concave configuration inward of the tire, and this part is extended from the inflection point f to the vicinity of (somewhere short of) a contact point g at which the carcass contacts with the bead core 2.

The radius R2 is greater than the radius R1, and the ratio of R1 to R2, that is, R1/R2 is greater than 0.5 and is smaller than 1.0 (0.5 < R1/R2 < 1.0), so that the concave arc part B2 has a smaller curvature than the convex arc part B1. Such radii R1, R2 are premised on the assumption that the above-mentioned arcs pass through the center of the carcass 6 in the thicknesswise direction.

By forming the above-mentioned bent zone B by using these two arc parts B1, B2, as shown in FIG. 2, when the internal pressure is lowered due to puncture or the like, the concave arc part B2 collapses with the inflection point f outside in the axial direction, while the sidewall portion 4 is smoothly deformed in a convex form outward, so that the bending is quite natural, thereby preventing concentration of strain in the sidewall portion 5 and avoiding occurrence of damage. Meanwhile, by setting the radius R1 smaller than the radius R2, this collapsing is made smooth, and the concentration of the strain may be alleviated. Besides, when the radius R2 is smaller than the radius R1, excessive bending may occur at the bead portion 3, and the bead portion 3 may be easily damaged, and still worse smooth bending of the outward convex form of the sidewall is impeded, and concentration of the strain is likely to be caused. Accordingly, the ratio R1/R2 is set to be greater than 0.5 and smaller than 1.0.

Furthermore, the ratio he/HC of the radial height he of the point e of the carcass maximum width WC from the bead base line L, to the section height HC of the carcass, is set to be more than 0.4 and less than 0.6. In other words, if the ratio he/HC is smaller than 0.4, or the point e of the maximum width WC of the carcass is brough extremely closer to the bead side, both the radii of curvature R1, R2 become small, and the sidewall portions 4 and bead portions are extremely bent and may be damaged. If the ratio he/HC is greater than 0.6, excessive stress is likely to occur in the buttress part of the tire, which makes it difficult to lessen the concentration of strain.

In each bead portion 3, an inner filler 10 made of hard rubber having an approximately triangular form becoming wider inward in the tire radial direction, is disposed axially inside the carcass 6 so as to form a bead toe 12 by the inner end thereof, which projects radially inward from the bead base line L.

Furthermore, the base of each bead portion 3 is provided on the radially outside of the toe 12 with a circumferentially extending groove 13 having a concave section extending to the toe 12.

In order to prevent rim deviation between the bead portions 3 and the rim 14 and to reinforce the bead toe, a chafer 15 or organic fiber cords is disposed along the outline of the bead portion to cover the range from the axially inside of the bead portion to the groove 13 through the the toe 12. The axially outer edge portion of this organic cord chafer is interposed between a rim chafer of hard rubber and the reinforcing layer 7.

The bead portions 3 are fitted onto the rim 14, by inserting the bead toes 12 into annular grooves 14 formed in the rim 14, and fitting humps 17 formed in the rim 14 into the grooves 13.

As explained above, in this embodiment, both the bead portions are provided with the bead toe 12 and groove 13, but such bead toe and groove may be formed in one of them.

WORKING EXAMPLES

According to the specifications shown in Table 1, test tires 205/65R15 in size were fabricated as working example tires (Ex. 1 and 2) of the present invention and a reference tire (Ref. 1).

Each test tire was inflated to only 5% of the normal internal pressure to simulate a puncture state, and pressed against a rotary drum at specified load, and then rotated by the number of times corresponding to a traveling distance of 5 km, and after that the sidewall portions and bead portions were checked for damage, which was evaluated into five ranks. The evaluations are summed up also in Table 1. The greater the score the better is the result.

TABLE 1

|  | Ex. 1 | Ex. 2 | Ref. 1 |
| --- | --- | --- | --- |
| Carcass | 2 plies Polyester | 2 plies Polyester | 2 plies Polyester |
| Belt | 2 plies Steel | 2 plies Steel | 2 plies Steel |
| Band | 2 plies Nylon | 2 plies Nylon | 2 plies Nylon |
| Aspect ratio (%) | 65 | 65 | 65 |
| Tread width WT (mm) | 209 | 209 | 162 |
| Carcass maximum width WC (mm) | 199 | 195 | 193 |
| Carcass section height HC (mm) | 118 | 118 | 118 |
| Height of carcass maximum width point he (mm) | 60 | 67 | 68 |
| he/HC | 0.51 | 0.57 | 0.58 |
| Height of tread edge hd (mm) | 92 | 100 | 124 |
| hd/HC × 100 (%) | 78 | 85 | 105 |
| R1/R2 | 0.71 | 0.87 | 1.29 |
| Test result score | 5 | 4 | 2 |

As apparent from Table 1, both the working example tires presented better results as compared with the reference tire.

Thus, in the safety tire of the present invention, the tread is wider than the maximum width of the carcass, and the part of the carcass from its maximum width point to the bead core is composed of the outward swollen convex arc part and the inward depressed concave arc part, and further their radii of curvature are set in the specified ranges. As a result, if the tire pressure drops suddenly due to puncture or the like, the tread becomes flat and allows one continue to travel safely, and moreover, since the zone from the sidewall portion to the bead portion is smoothly bent, damage in this zone is prevented. Hence the present invention presents a safety tire with an aspect ratio of 60 to 80%, enabling to travel safely for a relatively long distance.

What is claimed is:

1. A pneumatic tire having a tread portion, a pair of bead portions, a pair of sidewall portions therebetween, a pair of bead cores one disposed in each bead portion, a carcass extending between said bead portion through said sidewall portions and said tread portion and turned up in both edges around said bead cores to be secured thereto and to form carcass turnup portions and a carcass main portion therebetween, a tread disposed on said carcass, a belt disposed between said tread and said carcass and having cords laid at a relatively small angle to the tire equator, and a pair of bead apexes one disposed between said carcass main portion and each of said carcass turnup portions, wherein, in a state that the tire is assembled on a specified rim and inflated to a specified pressure, the aspect ratio of the tire defined as the tire sectional height/the tire maximum width is not more than 80%, the axial width WT of said tread is greater than the maximum width WC of the carcass, each edge of said tread is positioned at a height within a range 50 to 100% of the sectional height HC of said carcass, said carcass being provided on each side of the tire equator with a convex arc part with a radius R1 and a concave arc part with a radius R2, said arc parts smoothly contacting each other at an inflection point therebetween, said convex arc part having the center of curvature positioned inside the tire and extending radially inwardly from the point of the maximum width WC of said carcass to said inflection point, said concave arc part having its center of curvature positioned outside the tire and extending radially inwardly from said inflection point to the vicinity of a contact point at which the carcass contacts with the bead core, the radius R2 of said concave arc part is greater than the radius R1 of said convex arc part, and at least one of said bead portions being provided with a radially inwardly extending toe located axially inside said bead core to be inserted into an annular groove formed on the rim, and a groove located axially outside said toe to be fitted into a hump formed on the rim.

2. The tire as set forth in claim 1, wherein the ratio R1/R2 of said radius R1 to said radius R2 is greater than 0.5 and less than 1.0.

3. The tire as set forth in claim 1 or 2, wherein, the ratio he/HC of a radial height he of said point of maximum width of the carcass from a bead base line, to said section height HC of the carcass is greater than 0.4 and smaller than 0.6.

* * * * *